United States Patent
Yang et al.

(10) Patent No.: US 8,831,638 B2
(45) Date of Patent: Sep. 9, 2014

(54) LOCATION-BASED SERVICE SYSTEM AND METHOD FOR GENERATING SECONDARY INFORMATION

(75) Inventors: Byoung Seok Yang, Seongnam-si (KR); Jin Sung Kim, Seongnam-si (KR)

(73) Assignee: NHN Business Platform Corporation, Seongnam-si (KR)

( * ) Notice: Subject to any disclaimer, the term of this patent is extended or adjusted under 35 U.S.C. 154(b) by 152 days.

(21) Appl. No.: 13/267,359

(22) Filed: Oct. 6, 2011

(65) Prior Publication Data

US 2012/0270565 A1 Oct. 25, 2012

(30) Foreign Application Priority Data

Oct. 7, 2010 (KR) .......................... 10-2010-0097806

(51) Int. Cl.
*H04W 24/00* (2009.01)
*H04W 4/18* (2009.01)
*H04W 4/02* (2009.01)

(52) U.S. Cl.
CPC .............. *H04W 4/185* (2013.01); *H04W 4/028* (2013.01)
USPC .................... 455/456.3; 455/456.1; 455/456.2

(58) Field of Classification Search
USPC ........ 455/456.3; 709/206; 701/424, 532, 517, 701/420; 340/995.19–995.21, 990
See application file for complete search history.

(56) References Cited

U.S. PATENT DOCUMENTS

| 5,919,246 | A | * | 7/1999 | Waizmann et al. | 701/424 |
| 5,974,356 | A | * | 10/1999 | Doyle et al. | 701/420 |
| 2005/0159883 | A1 | * | 7/2005 | Humphries et al. | 701/207 |
| 2005/0251325 | A1 | * | 11/2005 | Kudo et al. | 701/200 |
| 2005/0273250 | A1 | * | 12/2005 | Hamilton et al. | 701/200 |
| 2008/0005251 | A1 | * | 1/2008 | Im et al. | 709/206 |
| 2009/0241040 | A1 | * | 9/2009 | Mattila et al. | 715/760 |

FOREIGN PATENT DOCUMENTS

KR 10-0750380 11/2006
KR 10-2009-0112359 10/2009

* cited by examiner

*Primary Examiner* — Nathan Taylor
(74) *Attorney, Agent, or Firm* — Greer Burns & Crain Ltd.

(57) ABSTRACT

Provided are a location-based service system and method for generating secondary information. The location-based service system, which includes a processor, may include an information receiving unit to receive location information corresponding to a location in a route of a user, and an information adding unit to add to multimedia content that the user created, using the processor, at least a part of the received location information and location-related information which is associated with the received location information.

11 Claims, 8 Drawing Sheets

LOCATION-BASED SERVICE SYSTEM AND METHOD FOR GENERATING SECONDARY INFORMATION

CROSS-REFERENCE TO RELATED APPLICATION

This application claims priority from and the benefit of Korean Patent Application No. 10-2010-0097806, filed on Oct. 7, 2010, which is hereby incorporated by reference for all purposes as if fully set forth herein.

BACKGROUND

1. Technical Field

Exemplary embodiments of the present invention relates to a location-based service system and method for generating secondary information based on location-based information.

2. Discussion of the Background

In wireless communication systems, a location of a user can often be tracked using a Global Positioning System (GPS) or a mobile communication network through a terminal carried by the user. Information about the tracked location may be stored in real time, along with time information.

Hereinafter, a system and method that may efficiently use location information based on a route of the user will be provided.

SUMMARY

Exemplary embodiments of the present invention provide a location-based service system and method that may add, to multimedia content that the user created for web posting, location information based on a location in a route of the user, or location-related information.

Exemplary embodiments of the present invention also provide a location-based service system and method that may add, to multimedia content that the user created for web posting, location information based on a current location of the user, or location-related information.

Exemplary embodiments of the present invention also provide a location-based service system and method that may provide information associated with a transportation apparatus which the user is currently on board or the user desires to get on board, in relation to a route.

Exemplary embodiments of the present invention also provide a location-based service system and method that may add, multimedia content that the user created for web posting, information associated with a transportation apparatus which the user is currently on board or the user desires to get on board.

Additional features of the invention will be set forth in the description which follows, and in part will be apparent from the description, or may be learned by practice of the invention.

An exemplary embodiment of the present invention discloses a location-based service system including a processor, including an information receiving unit to receive location information corresponding to a location in a route of a user, and an information adding unit to add to multimedia content that the user created, using the processor, at least a part of the received location information and location-related information which is associated with the received location information.

The location-related information may include map information indicating a location corresponding to location information selected by the user.

The location-based service system may further include an additional information generation unit to generate additional information corresponding to location information selected by the user, and an additional information providing unit to provide the generated additional information to the user.

The information adding unit may add, to the multimedia content, additional information corresponding to the location information selected by the user from the generated additional information as the location-related information.

The additional information generation unit may include an extraction unit to extract a keyword from the selected location information, and a generation unit to generate, as the additional information, a result of searching for the extracted keyword.

The information receiving unit may further receive information associated with a transportation apparatus which the user is on board or the user desires to get on board in relation to the route. In this instance, the information adding unit may further add the information associated with the transportation apparatus to the multimedia content, and the location-based service system may further include a transportation information providing unit to provide the information associated with the transportation apparatus to the user.

Another exemplary embodiment of the present invention discloses a location-based service system, including an information receiving unit to receive information about a current location of a user, and an information adding unit to add the received information to multimedia content that the user created for web posting.

Still another exemplary embodiment of the present invention discloses a location-based service system, including a storage unit to associate and store information about at least one of whether a transportation apparatus is registered, a location of the transportation, and a driver of the transportation, an identification number receiving unit to receive an identification number of a transportation apparatus received through a user terminal, and an information transmitting unit to transmit, to the user terminal, at least a piece of information corresponding to the received identification number.

Yet another exemplary embodiment of the present invention discloses a method for providing location-based service using a processor, including receiving location information corresponding to a location in a route of a user, and adding to multimedia content the user created, using the processor, at least a part of the received location information and location-related information which is associated with the received location information.

Further another exemplary embodiment of the present invention discloses a location-based service method, including receiving information about a current location of a user, and adding the received information to multimedia content that the user created for web posting.

Still another exemplary embodiment of the present invention discloses a location-based service method, including associating and storing information about at least one of whether a transportation apparatus is registered, a location of the transportation, and a driver of the transportation, receiving an identification number of a transportation apparatus received through a user terminal, and transmitting, to the user terminal, at least a piece of information corresponding to the received identification number.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as being limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements. Throughout the drawings and the detailed description, unless otherwise described, the same drawing reference numerals are understood to refer to the same elements, features, and structures. The relative size and depiction of these elements may be exaggerated for clarity, illustration, and convenience.

It should be understood that when an element is referred to as being "connected to" another element, it can be directly connected to the other element, or intervening elements may be present. It should also be understood that any element, operation or command described herein is not to be construed as being an essential or principle feature of the present disclosure unless otherwise explicitly described. As used herein, the singular forms "a", "an" and "the" are intended to include the plural forms as well unless otherwise indicated. If only a single item is intended, the term "one" or similar terms will be used herein.

Figure 1:
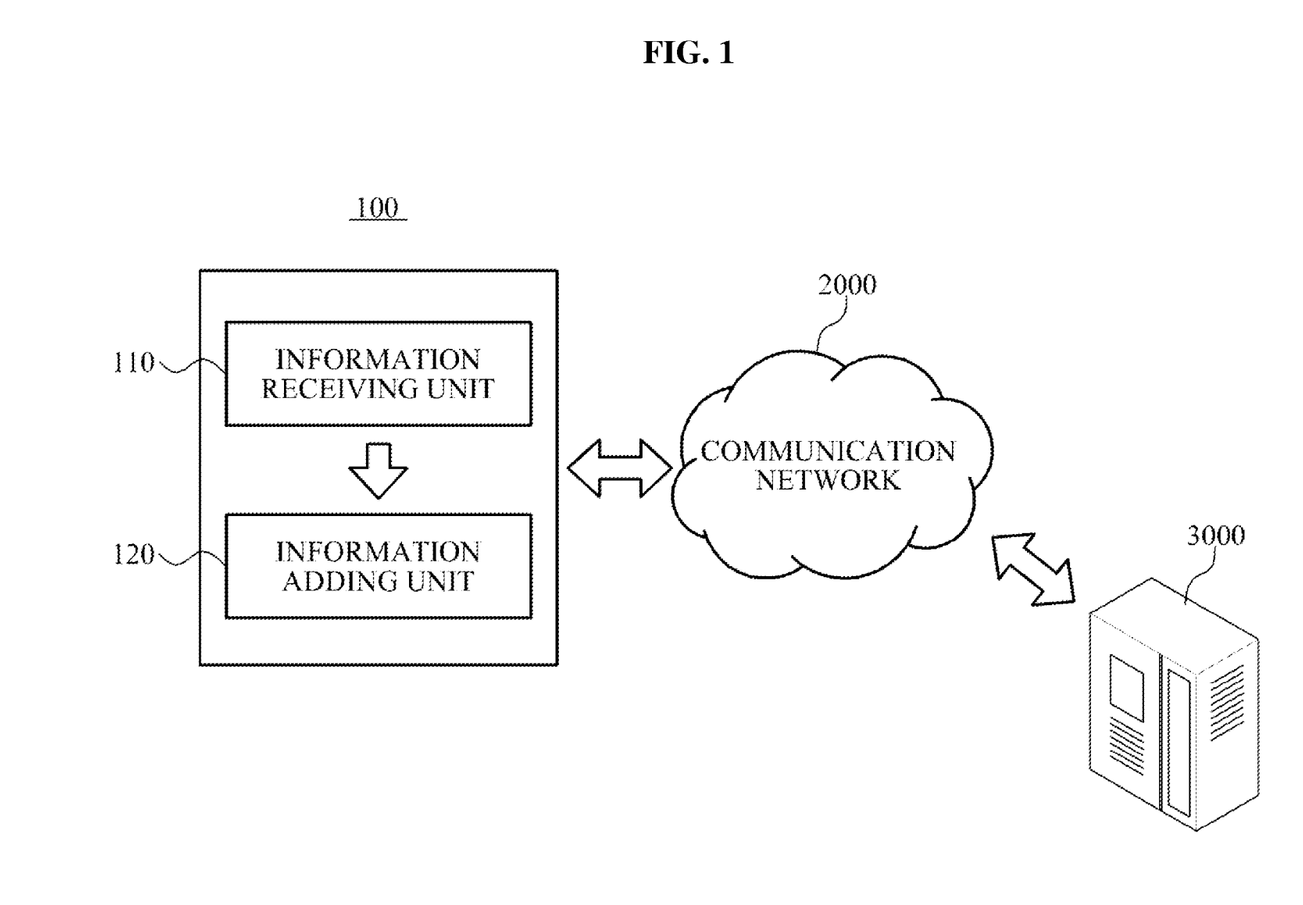
FIG. 1 is a block diagram to illustrate a configuration of a location-based service system which communicates with a web server 3000 through a communication network 2000 in according to an exemplary embodiment of the present invention.

FIG. 1 is a block diagram to illustrate a configuration of a location-based service system 100 which communicates with a web server 3000 through a communication network 2000 in according to an exemplary embodiment of the present invention. As shown in FIG. 1, the location-based service system 100 may communicate with other data communication devices such as a web server 3000, through a communication network 2000. The communication network 2000 could be the Internet. The location-based service system 100 may include an information receiving unit 110, and an information adding unit 120, as illustrated in FIG. 1.

The location-based service system 100 according to an exemplary embodiment of FIG. 1 may be operated by a separate server. According to another exemplary embodiment, the location-based service system 100 may be included in a terminal carried by a user, hereinafter referred to as a user terminal. Examples of such user terminal include, but not limited to, smart phones, tablet PCs, personal data assistance (PDA) devices, laptops and media players equipped with wireless communication capability. Such user terminal often includes one or more microprocessors to handle various operations including data processing relevant to the present invention as well as other general operations.

The web server 3000 may be a web hosting server for the user. The user may create multimedia content that will be posted on a web page hosted by the web server 3000. The location-based service system 100 may transmit, to the web server 3000, a set of digital data packets representing information to be added. Once transmitted and saved in the web server 3000, the multimedia content can be viewed by various clients, including the user terminal. An example of the web server 3000 is a server for providing a social network service (SNS) which allows users to communicate and exchange their personal information on the Internet.

The information receiving unit 110 may receive location information corresponding to locations in a route of a user. Here, the location information may be acquired by tracking a location of a terminal carried by the user using a Global Positioning System (GPS). The location information may also be acquired through the communication network. Such communication network may be one of mobile communication networks which includes, but not limited to, 2G/3G/4G networks such as GSM, GPRS, EDGE, CDMA2000, WCDMA, HSDPA/HSUPA, HSDA+, LTE and WiMAX. The communication network may also be a wireless LAN network such as 802.11a/b/g/n. In this instance, the location information for each location in the route of the user may be stored in a database of a predetermined server. The database may also store a plurality of location information entries for multiple locations for a route of a user, and the database may store multiple routes for a single user. The location for which the location information is received may be the current location of the user. Otherwise, the information receiving unit 110 may receive the location information corresponding to a past location in a route of the user stored in the database through the communication network 2000 in response to a user input. In this case, the user may select location information associated with a particular location by designating the location for which the location information is desired to be received. Also, the user may designate a specific date and time so that the location information and/or location-related information corresponds to the location where the user was at the specific time. For example, the user may desire to acquire location information associated with a location in today's route, or location information associated with a place where the user was at five thirty p.m. The information receiving unit 110 may receive the corresponding location information depending on time information input by the user.

The information adding unit 120 may add, to multimedia content the user created for posting on the web, at least a part of the received location information and location-related information. That is, the information adding unit 120 may add, to the multimedia content to be posted, the received location information, location-related information, or the like, to enable the information associated with the location of the user to be included in the multimedia content without the need of manually entering such information as a part of the content by the user.

When the location-based service system 100 is provided in the user terminal, the information adding unit 120 may operate to incorporate the at least a part of the received location information and location-related information into the multimedia content that the user created in the user terminal. When the location-based service system 100 is provided separate from the user terminal, the information adding unit 120 may operate to transmit the at least a part of the received location information and location-related information to either the user terminal or the web server 3000 so that the multimedia content created by the user can be displayed with the transmitted part of the location information and location-related information.

The terms "multimedia content" and "content" mean electronic data having multiple formats. The terms are sometimes used in contrast to single format data such as text-only, image-only, or audio-only. But in the context of the present invention, the terms "multimedia content" and "content" should be understood to have their broadest meaning, including text-only, audio-only, still images-only, animation-only, video-only or interactivity form-only as well as a combination of such data formats.

Here, the location-related information may be acquired by processing the received location information. The location-related information may also be additional information related to the received location information. For example, the location-related information may include map information on the location corresponding to the location information selected by the user from multiple entries of the received location information. For example, it may be assumed that a route of the user may show the multiple entries of location information in an order of "Samseong Station," "COEX Atlantic Hall," "Samseong Station," and "Pyeongchon Station." When the user selects "COEX Atlantic Hall," the information adding unit 120 may add, to the multimedia content, map information on a location of "COEX Atlantic Hall."

Figure 2:
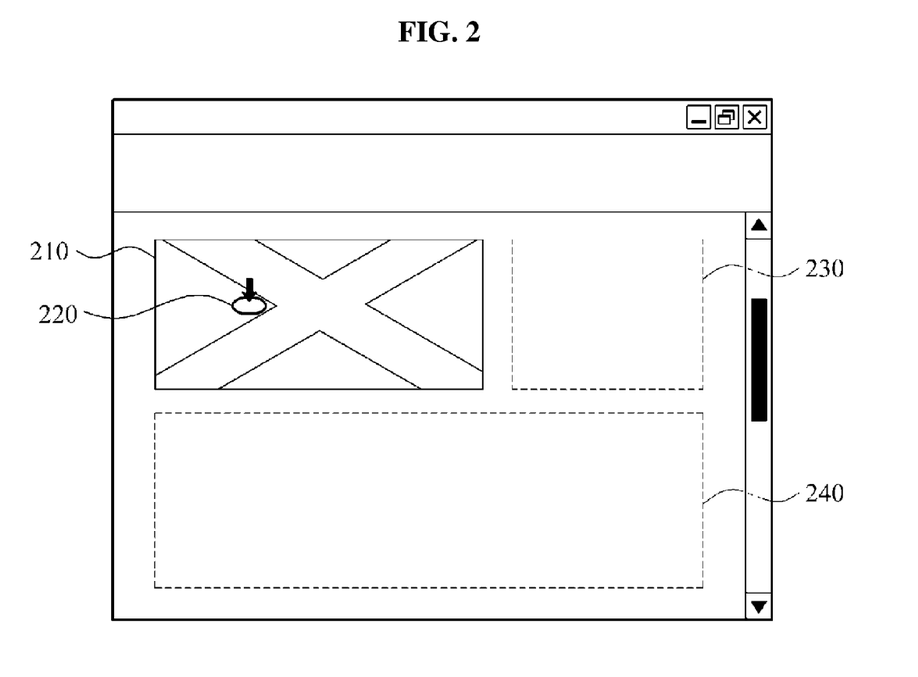
FIG. 2 is a diagram to illustrate a screen displaying multimedia content to which map information is added according to an exemplary embodiment of the present invention.

FIG. 2 is a diagram to illustrate a screen that displays multimedia content to which map information 210 is added according to an exemplary embodiment of the present invention. The map information 210 added to the content as illustrated in FIG. 2 will be posted on the web. In this instance, a location 220 corresponding to the location information selected by the user from multiple entries of the received location information may be indicated in the map information 210. For example, if the user desires to post information about a place where the user was at a specific time, the location of the corresponding place may be easily indicated.

Referring back to FIG. 1, the information adding unit 120 may add, to the content, the location information, not only by simply using the map information but also using various schemes. For example, the information adding unit 120 may indicate today's route of the user in the multimedia content which will be posted on the web. Additionally, the information adding unit 120 may add the location-related information in addition to the location information. In order to add the location-related information, the location-based service system 100 may further include an additional information generation unit (not shown) to generate additional information corresponding to the location information selected by the user from multiple entries of received location information, and an additional information providing unit (not shown) to provide the generated additional information to the user. In this instance, the information adding unit 120 may add, to the content, the additional information selected by the user from the generated additional information as the location-related information for the received location information. For example, the additional information generation unit may generate, as the additional information, information about a search result corresponding to the location information, or advertisement information corresponding to the location information. The additional information providing unit may provide, to the user, the generated information about the search result, or the advertisement information. In this instance, the information adding unit 120 may add, to the content to be posted, information about the search result or advertisement information selected by the user. The information about the search result or the advertisement information may be included in the content, or a link to a corresponding page may be set in the content.

In order to generate the information about the search result or the advertisement information, the additional information generation unit may include an extraction unit (not shown) to extract a keyword from the location information selected by the user, and a generation unit (not shown) to generate, as the additional information, a result of searching for the extracted keyword. For example, the extraction unit may extract, as keywords, "COEX," "Atlantic," and "Hall" from "COEX Atlantic Hall." The generation unit may generate, as the additional information, a result of searching for "COEX," "Atlantic," and "Hall." Here, the result of the search may include advertisements. If the user selects a search result, for example, associated with a concert at "COEX Atlantic Hall" from the generated additional information, the information adding unit 120 may add, to the content, the items included in the search result selected by the user, or may set, in the content, a link to a page corresponding to the selected search result.

Figure 3:
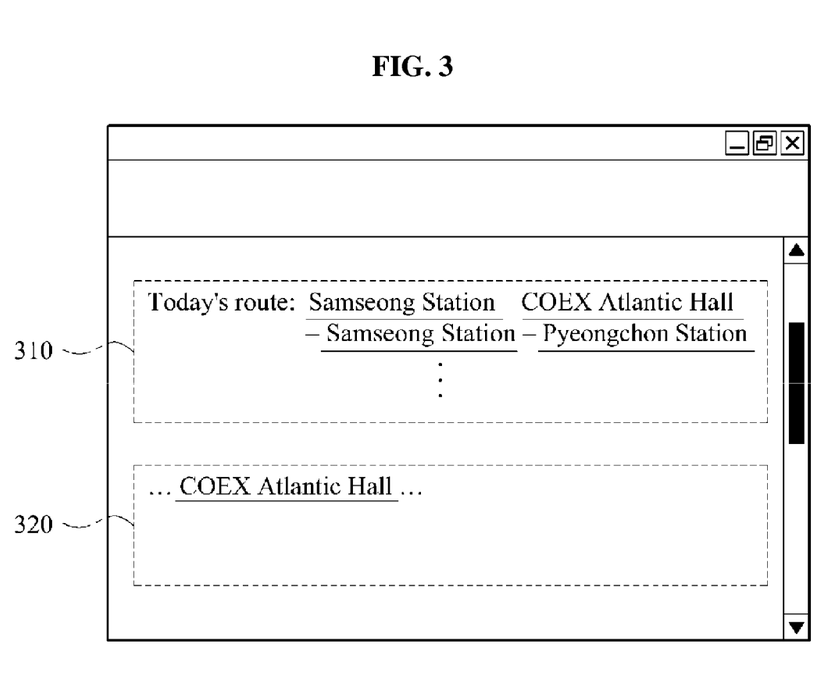
FIG. 3 is a diagram to illustrate a screen displaying multimedia content to which location information and location-related information are added according to an exemplary embodiment of the present invention.

FIG. 3 is a diagram to illustrate a screen that displays multimedia content to which location information and/or location-related information is added according to an exemplary embodiment of the present invention. FIG. 3 illustrates information added to the content to be posted on the web. A first dotted box 310 may indicate an example of today's route of the user being displayed, and a second dotted box 320 may indicate an example of a link to a predetermined page being set to "COEX Atlantic Hall" corresponding to the location information selected by the user. In this instance, as illustrated in FIG. 3, a link, which is the same as the aforementioned link, may be respectively set to each piece of location information corresponding to the today's route indicated in the first dotted box 310.

Referring to FIG. 1, the information receiving unit 110 may further receive information associated with a transportation apparatus which the user is currently on board or the user desires to get on board, in relation to the route. In this instance, the information associated with the transportation apparatus may be transmitted to a terminal carried by the user via a wireless communication system equipped in the transportation apparatus. As an example, information such as a location of a bus, the number of the bus, and the like, has been recently provided by the bus through a communication performed between the bus and bus stops. In this instance, the information associated with the transportation apparatus may be received through the information provided by the bus, and the like using the terminal carried by the user. As another example, information associated with a taxi may be acquired through a communication performed with a navigation system installed in the taxi. The information associated with the transportation apparatus may be more specific depending on the degree of comprehensiveness of the information service provided by the public transportation.

The information associated with the transportation apparatus that is transmitted to the terminal carried by the user may be transmitted to the location-based service system 100 using a mobile communication network, and the like, or may be transmitted to the aforementioned database of the predetermined server, and then transmitted to the location-based service system 100.

In this instance, the location-based service system 100 may further include a transportation information providing unit (not shown) to provide the information associated with the transportation apparatus to the user. Accordingly, the user may easily acquire information associated with the public transportation such as the transportation apparatus which the user is currently on board, and the like.

Additionally, the information adding unit 120 may add, to the content to be posted, the information associated with the transportation apparatus.

Figure 4:
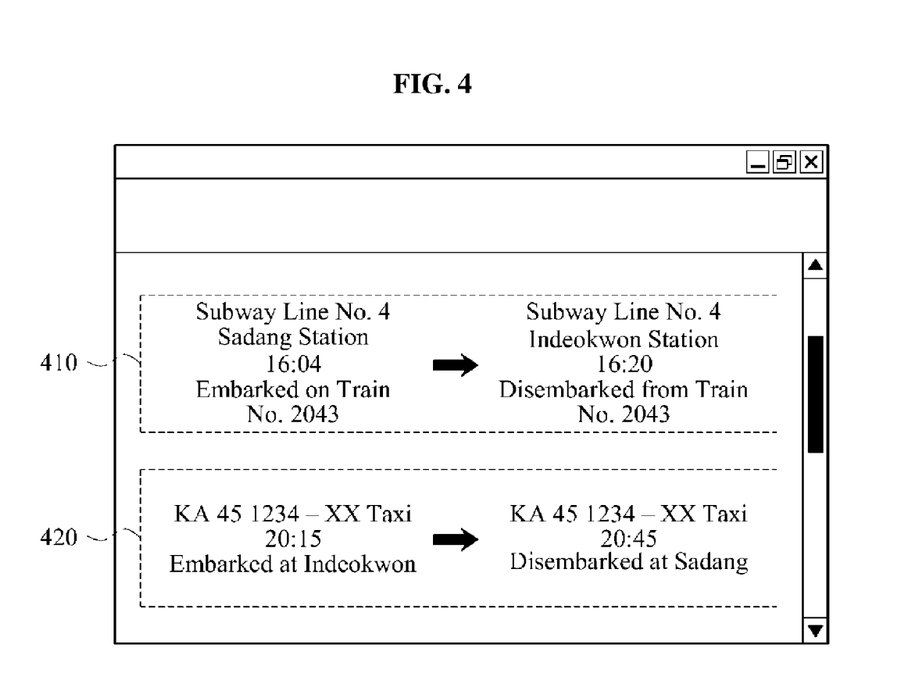
FIG. 4 is a diagram to illustrate a screen displaying multimedia content to which information associated with a transportation apparatus is added according to an exemplary embodiment of the present invention.

FIG. 4 is a diagram to illustrate a screen displaying multimedia content to which information associated with public transportation is added according to an exemplary embodiment of the present invention. A first dotted box 410 may indicate an example of information associated with a subway which the user was on board today is added, and a second dotted box 420 may indicate an example of information associated with a taxi which the user was in today was added.

As described above, the location-based service system 100 according to an exemplary embodiment of FIG. 1 may be operated as a separate server. Also, according to another exemplary embodiment, the location-based service system 100 may be included in a terminal carried by a user.

Referring to FIG. 1, the location-based service system 100 according to another exemplary embodiment may include the information receiving unit 110 to receive information about a current location of a user, and the information adding unit 120 to add the received information to multimedia content that the user created for posting on the web.

When a piece of multimedia content, such as a blog post is created for posting on the web using a user terminal, the location-based service system 100 included in the user terminal may receive information about a current location of the user terminal using the aforementioned GPS or mobile communication network, and may add the received information to the content.

In this instance, the location-based service system 100 included in the user terminal may also include the configurations described with reference to FIGS. 1 through 4. For example, the location-based service system 100 may include the configurations that may generate additional information based on a current location via a wireless communication network such as a mobile communication network of the user terminal, add the generated additional information to the post, or set a link to a corresponding page. The configurations have been already described in detail and thus, a duplicated description will be omitted for conciseness.

When the location-based service system 100 is included in the user terminal, additional information may be further acquired. For example, various types of information such as information regarding whether the corresponding transportation apparatus is registered, information about a current location, and information about a driver of the transportation apparatus may be acquired in advance using an identification number of the transportation apparatus which the user currently desires to get on. In this instance, a system for providing the various pieces of information may be required.

Figure 5:
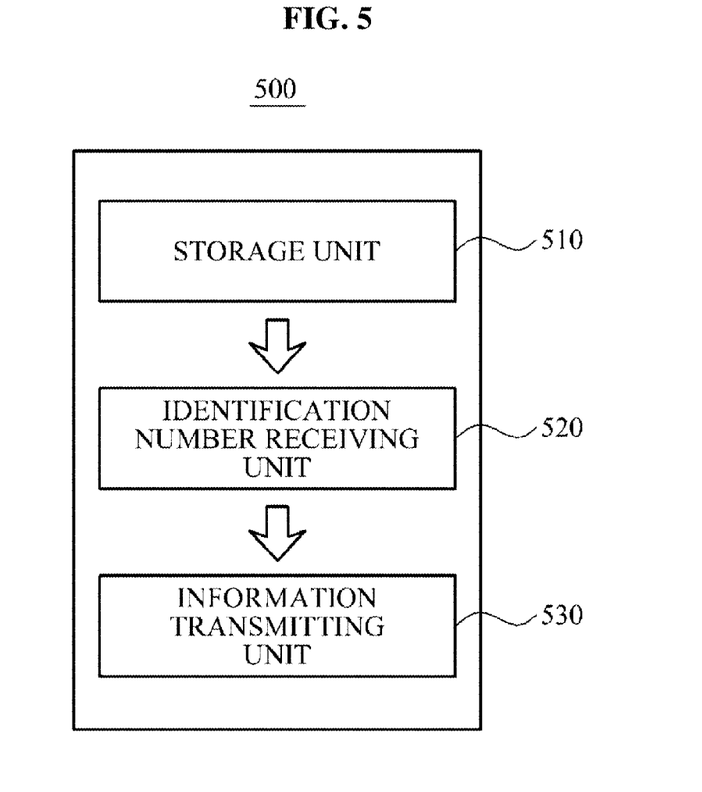
FIG. 5 is a block diagram to illustrate a configuration of a location-based service system according to another exemplary embodiment of the present invention.

FIG. 5 is a block diagram to illustrate a configuration of a location-based service system 500 according to another exemplary embodiment of the present invention. As illustrated in FIG. 5, the location-based service system 500 may include a storage unit 510, an identification number receiving unit 520, and an information transmitting unit 530.

The storage unit 510 may associate and store information about at least one of whether the transportation apparatus is registered, a location of the transportation apparatus, and a driver of the transportation apparatus.

The identification number receiving unit 520 may receive an identification number of the transportation apparatus received through a user terminal. For example, the identification number may include a vehicle registration number.

The information transmitting unit 530 may transmit, to the user terminal, at least one type of information corresponding to the received identification number.

By receiving information associated with the transportation apparatus by a user terminal through the location-based service system 500, a user may more conveniently use the transportation apparatus, and a desire for personal safety may be satisfied. For example, the user may verify whether a transportation apparatus which the user desires to get on, for example, a taxi is registered, based on information regarding whether the taxi is registered, and may verify whether a place where the user currently desires to get in the taxi matches the identified location of the registered taxi. Additionally, the user may more safely use the transportation apparatus by identifying a photo of a driver, and the like as driver information.

Figure 6:
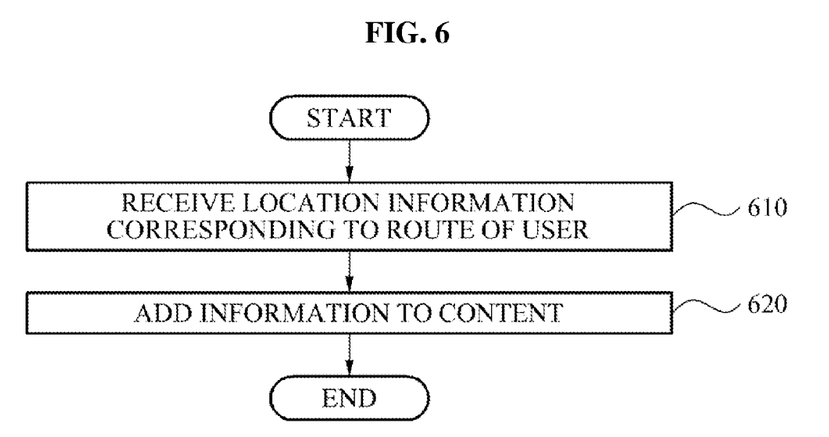
FIG. 6 is a flowchart to illustrate a method for providing a location-based service according to an exemplary embodiment of the present invention.

FIG. 6 is a flowchart to illustrate a method for providing a location-based service according to an exemplary embodiment of the present invention. The method for providing a location-based service may be performed by the location-based service system 100 according to an exemplary embodiment described with reference to FIG. 1.

In operation 610, the location-based service system 100 may receive location information corresponding to a location in a route of a user. Here, the location information may be acquired by tracking a location of a user terminal carried by a user using a GPS. The location information may also be acquired through a mobile communication network. In this instance, the location information based on the route may be stored in a database of a predetermined server. The database may also store a plurality of location information entries for multiple locations for a route of a user, and the database may also store multiple routes for a single user. The location for which the location information is received may be the current location of the user. Otherwise, the location-based service system 100 may receive the location information corresponding to a past location in a route of the user stored in the database. In this case, the user may designate the location for which the location information will be received. Also, the user may alternatively designate a specific date and time so that the location information corresponding to the location where the user was at the specific time. For example, the user may desire to acquire location information associated with a location in today's route, or location information associated with a place where the user was at five thirty p.m. The location-based service system 100 may receive the corresponding location information depending on time information input by the user.

In operation 620, the location-based service system 100 may add, to the content that the user created for posting on the web, at least a part of the received location information and the location-related information. That is, the location-based service system 100 may add, to the content, the received location information, location-related information, or the like, to enable the information associated with the location of the user to be included in the content without the need of manually entering such information as a part of the content by the user.

Figure 7:
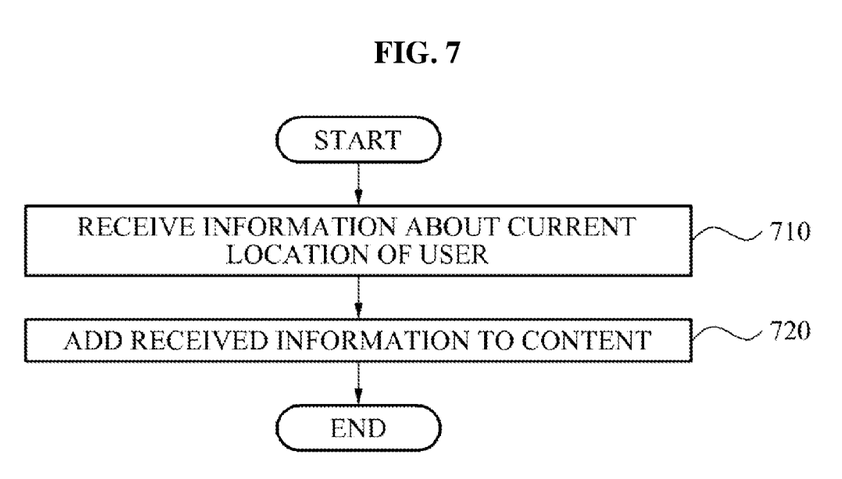
FIG. 7 is a flowchart to illustrate a method for providing a location-based service according to another exemplary embodiment of the present invention.

FIG. 7 is a flowchart to illustrate a method for providing a location-based service according to another exemplary embodiment of the present invention. The method for providing a location-based service may be performed by the location-based service system 100 according to another exemplary embodiment described with reference to FIG. 1.

In operation 710, the location-based service system 100 may receive information about a current location of a user.

In operation 720, the location-based service system 100 may add the received information to multimedia content that the user created for posting on the web.

Descriptions omitted in FIGS. 6 and 7 may be referred to the descriptions described with reference to FIGS. 1 through 4.

Figure 8:
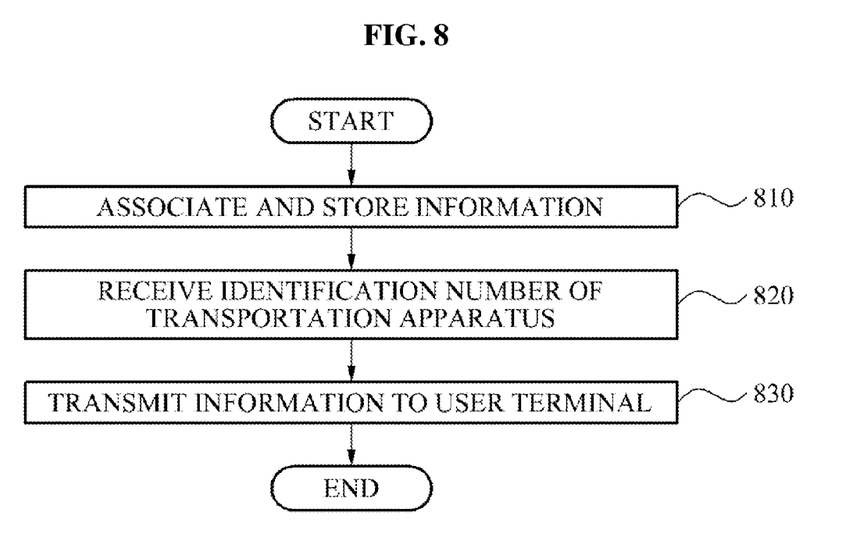
FIG. 8 is a flowchart to illustrate a method for providing a location-based service according to still another exemplary embodiment of the present invention.

FIG. 8 is a flowchart to illustrate a method for providing a location-based service according to still another exemplary embodiment of the present invention. The method for providing a location-based service may be performed by the location-based service system 500 described with reference to FIG. 5.

In operation 810, the location-based service system 500 may associate and store information about at least one of whether a transportation apparatus is registered, a location of the transportation apparatus, and a driver of the transportation apparatus.

In operation 820, the location-based service system 500 may receive an identification number of the transportation apparatus received through a user terminal. For example, the identification number may include a vehicle registration number.

In operation 830, the location-based service system 500 may transmit, to the user terminal, at least one piece of information corresponding to the received identification number.

By receiving information associated with a transportation apparatus by a user terminal using the method for providing a location-based service, the user may more conveniently use the transportation apparatus, and a desire for personal safety may be satisfied. For example, the user may verify whether a transportation apparatus which the user desires to get on board, for example, a taxi is registered, based on the information regarding whether the taxi is registered, and may verify whether a place where the user currently desires to get in the taxi matches the identified location of the registered taxi. Additionally, the user may more safely use the transportation apparatus by identifying a photo of a driver, and the like as driver information.

According to exemplary embodiments of the present invention, it is possible to add, to the multimedia content the user created for posting on the web by a user, location information based on a route of the user, location information based on a current route of the user, or location-related information. Also, it is possible to provide information associated with the transportation apparatus which the user is on board, or the user desires to get on board in relation to the route. It is possible to add, to the multimedia content for posting on the web, the information associated with the transportation apparatus which the user is on board or the user desires to get on board.

The exemplary embodiments according to the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts.

According to exemplary embodiments of the present invention, it is possible to add, to multimedia content for posting on the web by a user, location information based on a route of the user, or location-related information.

According to exemplary embodiments of the present invention, it is possible to add, to multimedia content for posting on the web by a user, location information based on a current location of the user, or location-related information.

According to exemplary embodiments of the present invention, it is possible to provide information associated with a transportation apparatus which the user is on board or desires to get on board in relation to a route.

According to exemplary embodiments of the present invention, it is possible to add, to multimedia content for posting on the web by a user, information associated with a transportation apparatus which the user is on board or desires to get on board.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A location-based service system including a processor, comprising:
    an information receiving unit to receive, from a database of the system, location information associated with a location selected by a user of a user terminal and corresponding to a location in a route of the user terminal, the route of the user terminal being determined based on at least one tracked location of the user terminal;
    an additional information generation unit to generate additional location-related information using the received location information;
    an additional information providing unit to provide the additional location-related information to the user, so that the user selects at least a portion of the additional location-related information to add to multimedia content generated by the user; and
    an information adding unit, using the processor, to add the received location information and the additional location-related information selected by the user to the multimedia content generated by the user;
    wherein the additional information generation unit includes an extraction unit to extract a keyword from the received location information, and a generation unit to generate, as the additional location-related information, a result of searching for the extracted keyword.

2. The system of claim 1, wherein the additional location-related information comprises map information indicating the tracked location selected by the user.

3. The system of claim 1, wherein the information receiving unit further receives information associated with a transportation apparatus which the user is on board or the user desires to get on board in relation to the route.

4. The system of claim 3, wherein the information adding unit further adds the information associated with the transportation apparatus to the user-generated multimedia content.

5. The system of claim 3, further comprising:
a transportation information providing unit to provide the information associated with the transportation apparatus to the user.

6. A method for providing location-based service using a processor, comprising:
receiving, from a database of the system, location information associated with a location selected by a user of a user terminal and corresponding to a location in a route of the user terminal, the route of the user terminal having at least one tracked location;
generating, using the processor, additional location-related information using the received location information;
providing the additional location-related information to the user, so that the user selects at least a portion of the additional location-related information to add to user-generated multimedia content; and
adding, using the processor, the received location information and the additional location-related information selected by the user to the user-generated multimedia content;
wherein the generating of the additional location-related information comprises extracting a keyword from the received location information, and generating, as the additional location-related information, a result of searching for the extracted keyword.

7. The method of claim 6, wherein the location-related information comprises map information indicating the tracked location selected by the user.

8. The method of claim 6, further comprising:
receiving information associated with a transportation apparatus which the user is on board or the user desires to get on board in relation to the route.

9. The method of claim 8, further comprising:
adding the information associated with the transportation apparatus to the generated multimedia content.

10. The method of claim 8, further comprising:
providing the information associated with the transportation apparatus to the user.

11. A method for providing location-based service using a processor, comprising:
receiving, from a database of the system, location information associated with a location selected by a user of a user terminal and corresponding to a location in a route of the user terminal, the route of the user terminal having at least one tracked location;
generating, using the processor, additional location-related information using the received location information;
providing the additional location-related information to the user, so that the user selects at least a portion of the additional location-related information to add to the user generated multimedia content; and
adding, using the processor, the received location information and the additional location-related information selected by the user to the user-generated multimedia content,
wherein the generating additional location-related information includes:
extracting a keyword from the received location information; and
generating, as the additional location-related information, a result of searching for the extracted keyword.

* * * * *